US009997762B2

United States Patent
Hwang (10) Patent No.: US 9,997,762 B2
(45) Date of Patent: Jun. 12, 2018

(54) PROTECTION ELEMENT AND RECHARGEABLE BATTERY INCLUDING THE SAME

(71) Applicant: SAMSUNG SDI CO., LTD., Yongin-si, Gyeonggi-do (KR)

(72) Inventor: Yu-Sik Hwang, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 390 days.

(21) Appl. No.: 14/748,775

(22) Filed: Jun. 24, 2015

(65) Prior Publication Data

US 2016/0268585 A1 Sep. 15, 2016

(30) Foreign Application Priority Data

Mar. 10, 2015 (KR) ........................ 10-2015-0033420

(51) Int. Cl.
| | |
|---|---|
| *H01M 2/34* | (2006.01) |
| *H02H 9/02* | (2006.01) |
| *H01C 7/02* | (2006.01) |
| *H02J 7/00* | (2006.01) |
| *H02H 7/18* | (2006.01) |
| *H01C 7/00* | (2006.01) |
| *H01C 1/14* | (2006.01) |
| *H01M 2/04* | (2006.01) |

(52) U.S. Cl.
CPC ............. *H01M 2/348* (2013.01); *H01C 1/14* (2013.01); *H01C 7/008* (2013.01); *H01C 7/021* (2013.01); *H01M 2/043* (2013.01); *H01M 2/0404* (2013.01); *H02H 7/18* (2013.01); *H02H 9/026* (2013.01); *H02J 7/0029* (2013.01); *H01M 2200/106* (2013.01); *H02J 2007/004* (2013.01); *H02J 2007/0037* (2013.01)

(58) Field of Classification Search
None
See application file for complete search history.

(56) References Cited

U.S. PATENT DOCUMENTS

| 4,919,744 A | * | 4/1990 | Newman | ................ | H01C 7/027 |
|---|---|---|---|---|---|
| | | | | | 156/292 |
| 5,192,853 A | * | 3/1993 | Yeh | ......................... | H05B 3/06 |
| | | | | | 219/505 |

(Continued)

FOREIGN PATENT DOCUMENTS

| JP | 1997-191183 A | 7/1997 |
|---|---|---|
| KR | 10-2013-0088721 A | 8/2013 |
| KR | 10-2014-0062470 A | 5/2014 |

*Primary Examiner* — Rena Dye Cronin
(74) *Attorney, Agent, or Firm* — Lee & Morse, P.C.

(57) ABSTRACT

A protection element includes a positive temperature coefficient (PTC) material layer, a second conductive layer on a second surface of the PTC material layer, a first electrode lead layer on the first conductive layer, and a second electrode lead layer on the second conductive layer. The first conductive layer includes a plurality of laminated first layers and the second conductive layer includes a plurality of laminated second layers. The first conductive layer has a plurality of first through-holes including a first conductive material to connect at least two of the first layers. The second conductive layer having a plurality of second through-holes including a second conductive material to connect at least two of the second layers.

17 Claims, 5 Drawing Sheets

(56) References Cited

U.S. PATENT DOCUMENTS

| | | | |
|---|---|---|---|
| 5,854,471 A * | 12/1998 | Tadokoro | F24H 3/0429 |
| | | | 219/505 |
| 2007/0057759 A1 * | 3/2007 | Koyama | H01C 1/1406 |
| | | | 338/22 R |
| 2013/0194771 A1 | 8/2013 | Hwang et al. | |
| 2014/0035719 A1 | 2/2014 | Lee et al. | |
| 2015/0029630 A1 | 1/2015 | Usui | |

* cited by examiner

PROTECTION ELEMENT AND RECHARGEABLE BATTERY INCLUDING THE SAME

CROSS-REFERENCE TO RELATED APPLICATION

Korean Patent Application No. 10-2015-0033420, filed on Mar. 10, 2015, and entitled, "Protection Element and Rechargeable Battery Including the Same," is incorporated by reference herein in its entirety.

BACKGROUND

1. Field

One or more embodiments described herein relate to a protection element and a rechargeable battery including a protection element.

2. Description of the Related Art

Various conditions may occur when a rechargeable battery is repeatedly charged and discharged. For example, the battery may be overcharged or over-discharged. When this occurs, gas or heat may be generated due to decomposition of an electrolyte solution in the rechargeable battery. The gas or heat may adversely affect the battery, e.g., the gas or heat may damage or otherwise deteriorate performance of the battery.

To address these effects, a rechargeable battery may be equipped with a protective circuit module for preventing overcharge or over-discharge. The protective circuit module may include a protective circuit board electrically connected to a protection element and an electrode assembly. A current path may be formed among the protective circuit board, the protection element, and the electrode assembly.

For example, according to one arrangement, the protection element is connected to an electrode terminal mounted to a cap plate and resultantly electrically connected to a negative electrode of the electrode assembly. The protective circuit board is connected to the cap plate charged as a positive electrode and resultantly electrically connected to a positive electrode of the electrode assembly. Hence, the protection element and the protective circuit board are electrically connected to each other, so that a current path is formed among the protection element, the protective circuit board, and the negative and positive electrodes of the electrode assembly.

However, in the protection element, an electrode lead connected to the electrode terminal and an electrode lead connected to the protective circuit board are laminated directly on a conductive layer made of a similar metal. Consequently, the protection element is easily separated even by a weak external impact and, thus, the rechargeable battery including the protection element may be damaged.

SUMMARY

In accordance with one or more embodiments, a protection element includes a positive temperature coefficient (PTC) material layer; a first conductive layer on a first surface of the PTC material layer, the first conductive layer including a sequential lamination of a first metal layer, an adhesive layer including a plurality of conducting portions, and a second metal layer electrically connected to the first metal layer through the conducting portions; a second conductive layer on a second surface of the PTC material layer, the second conductive layer including a sequential lamination of a first metal layer, an adhesive layer including a plurality of conducting portions, and a second metal layer electrically connected to the first metal layer through the conducting portions; a first electrode lead layer electrically connected to the first conductive layer; and a second electrode lead layer electrically connected to the second conductive layer.

The conducting portion of the first conductive layer and the conducting portion of the second conductive layer may be aligned substantially in a same column. A total sum of cross-sectional areas of the conducting portions in a first direction may be about 20% to 70% of a cross-sectional area of the adhesive layer in the first direction.

The conducting portion may include a through-hole, and a section of the through-hole in the first direction may have a substantially circular shape with a diameter of about 100 µm to 200 µm. The through-hole may have a wall surface coated with a conductive material. An interior of the through-hole may be filled with a conductive material. A thickness of the adhesive layer may be about 10 µm to 30 µm. A thickness of the protection element may be about 0.3 mm to 1 mm.

In accordance with one or more other embodiments, a rechargeable battery includes a case including an electrode assembly, the electrode assembly including a first electrode and a second electrode; a cap plate coupled to an opening of the case; an electrode terminal coupled to the cap plate and electrically connected to the first electrode; a protective circuit board mounted on the cap plate, the protective circuit board electrically connected to the second electrode; and the protection element as claimed in claim 1 having a first side connected to the electrode terminal and a second side connected to the protective circuit board. The first electrode lead layer of the protection element may be electrically connected to the protective circuit board, and the second electrode lead layer of the protection element may be electrically connected to the electrode terminal.

In accordance with one or more other embodiments, an apparatus includes a positive temperature coefficient (PTC) material layer; a first conductive layer on a first surface of the PTC material layer; and a second conductive layer on a second surface of the PTC material layer, wherein the first conductive layer includes a plurality of laminated first layers and the second conductive layer includes a plurality of laminated second layers, the first conductive layer having a plurality of first through-holes including a conductive material to connect at least two of the first layers, and the second conductive layer having a plurality of second through-holes including a conductive material to connect at least two of the second layers.

The first layers may include a first metal layer, an adhesive layer, and a second metal layer, the adhesive layer including the first through-holes, and the second layers may include first metal layer, an adhesive layer, and a second metal layer, the adhesive layer including the second through-holes.

In each of the first through-holes, the conductive material may be on a wall of the first through-holes and another hole passes through the conductive material, and in each of the second through-holes, the conductive material may be on a wall of the second holes and another hole passes through the conductive material. The conductive material may fill the first through-holes and the second through-holes.

The first through-holes may be substantially aligned with respective ones of the second through-holes. A total sum of sectional areas of the first through-holes may be substantially 20% to 70% of a sectional area of the adhesive layer of the first layers, and total sum of sectional areas of the second through-holes may be substantially 20% to 70% of a sectional area of the adhesive layer of the second layers. Sizes of the first-through holes and the second through-holes may be substantially equal.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
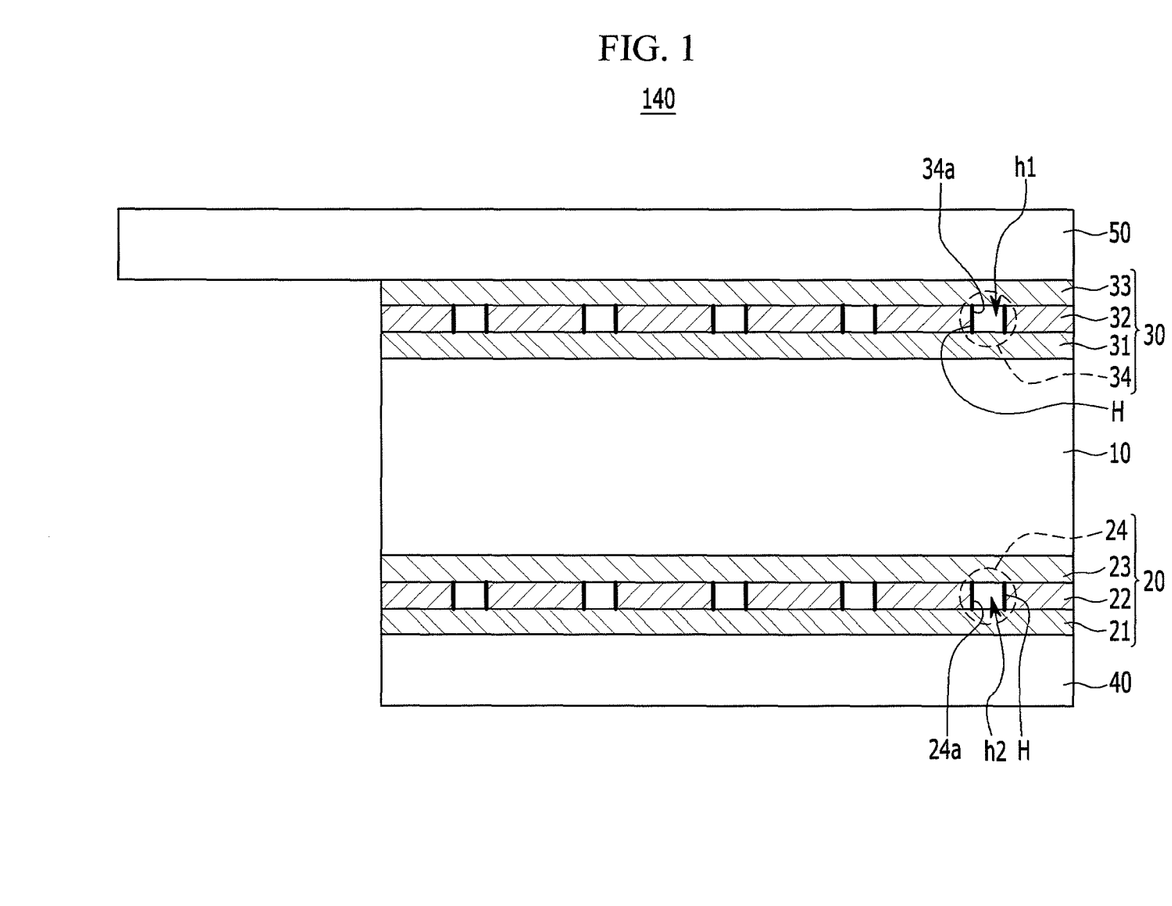
FIG. 1 illustrates an embodiment of a protection element.

FIG. 1 illustrates a vertical section of an embodiment of a protection element 140 which includes a positive temperature coefficient (PTC) material layer 10, a first conductive layer 20, a second conductive layer 30, a first electrode lead layer 40, and a second electrode lead layer 50.

Figure 4:
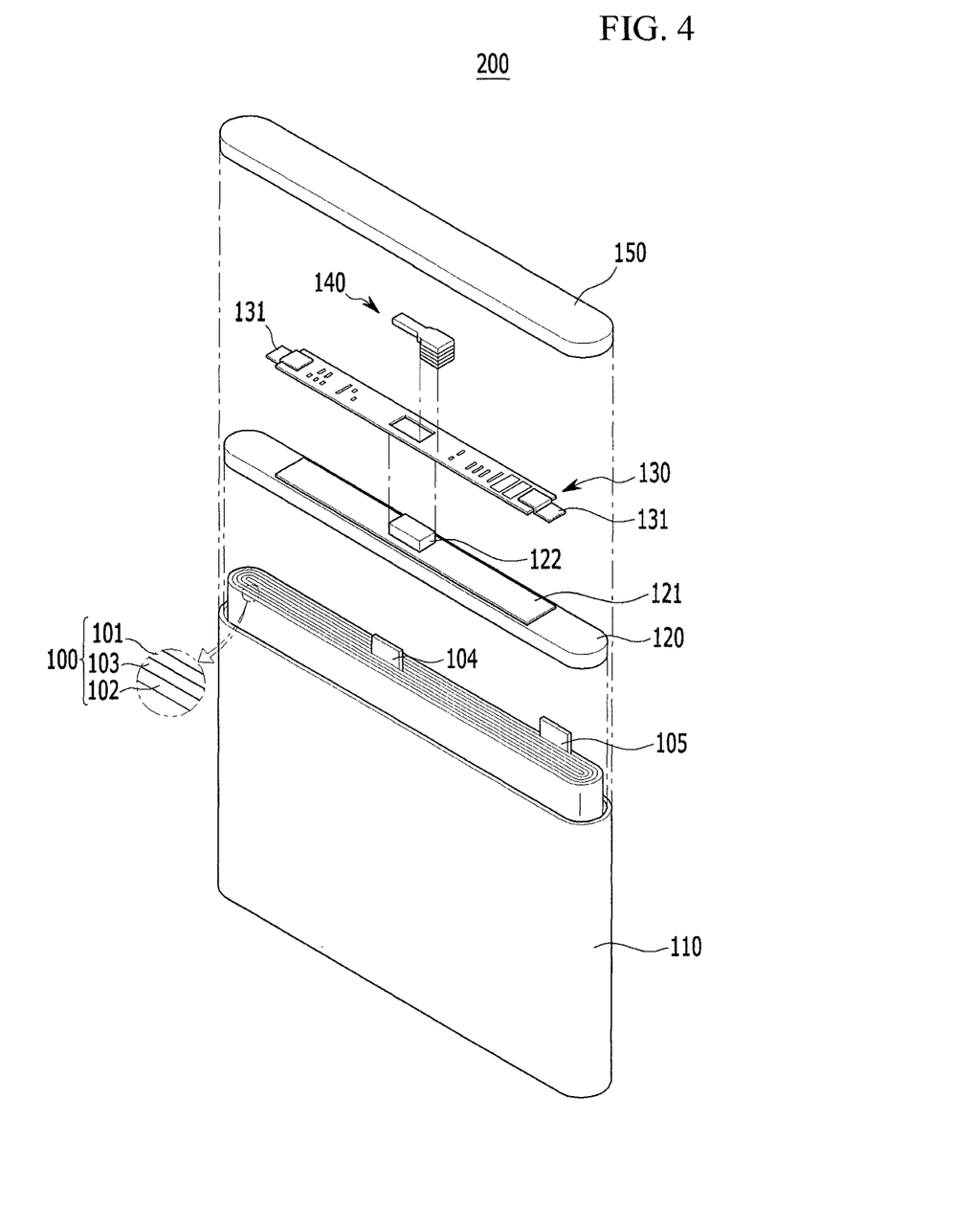
FIG. 4 illustrates an embodiment of a rechargeable battery.

The PTC material layer 10 may be a resistive element having an electrical resistance that changes depending on temperature. For example, as shown in FIG. 4, if the temperature of an electrode assembly 100 reaches a predetermined risk value, the protection element 140 cuts off the current path between an electrode terminal 122 and a protective circuit board 130. If the temperature of the electrode assembly 100 then reaches a predetermined safe value, the protection element 140 allows the electrode terminal 122 and the protective circuit board 130 to be electrically connected to each other again.

The first and second conductive layers 20 and 30 are laminated on opposite surfaces of the PTC material layer 10. For example, the first conductive layer 20 may include a sequential lamination of a first metal layer 21, an adhesive layer 22 including a plurality of conducting portions 24, and a second metal layer 23. The second conductive layer 30 may a sequential lamination of a first metal layer 31, an adhesive layer 32 including a plurality of conducting portions 34, and a second metal layer 33.

The first metal layers 21 and 31 enable current to be conducted on opposite surfaces of the PTC material layer 10. In one embodiment, the first metal layers 21 and 31 may be formed to include a predetermined metal (e.g., gold) coated on a metal foil, e.g., copper (Cu) plated with nickel (Ni).

The adhesive layers 22 and 32 include an insulative material having adherence. Each of the adhesive layers 22 and 32 may be formed to include one or more prepreg sheets laminated on the first metal layers 21 and 31 on opposite surfaces of the PTC material layer 10 and thermally compressed. In one embodiment, each prepreg sheet may include an epoxy resin having an adhesive function impregnated into glass fabric or a glass mat to be gelatinated.

The thickness of the adhesive layers 22 and 32 may be formed, for example, in a range of about 10 μm to 30 μm. In this range and for at least some applications, it may be possible to ensure excellent adherence while not deteriorating the conduction performance of the protection element 140. The thickness of the adhesive layers 22 and 32 may be different in another embodiment.

The conducting portions 24 and 34 are formed in through-holes H in the adhesive layers 22 and 32. The conducting portion 24 allows the first metal layer 21 to be electrically connected to the second metal layer 23. The conducting portions 34 allow the first metal layer 31 to be electrically connected to the second metal layer 33.

In one embodiment, the conducting portions 24 of the first conductive layer 20 and the conducting portions 34 of the second conductive layer 30 may be aligned in respective columns. When a rechargeable battery 200 (see, e.g., FIG. 4) is configured using the protection element 140, it may therefore be possible to improve the conduction performance of the protection element 140 as a result of this alignment, e.g., to more smoothly form a current path between the electrode assembly 100 and the protective circuit board 130. In another embodiment, the conducting portions 24 and 34 may not be aligned.

The total sum of the horizontal cross-sectional areas of the conducting portions 24 and 34 (or the through-holes H) may be, for example, about 20% to 70% of the horizontal cross-sectional area of the adhesive layers 22 and 32. For some applications, when the total sum of the horizontal cross-sectional areas of the conducting portions 24 and 34 (or through-holes H) satisfies the numerical range of the horizontal cross-sectional area of the adhesive layers 22 and 23, current may be smoothly conducted in the protection element 140 while ensuring excellent adherence. The total sum of the horizontal cross-sectional areas of the conducting portions 24 and 34 may be different relative to the horizontal cross-sectional area of the adhesive layers 22 and 32 in another embodiment.

Figure 2:
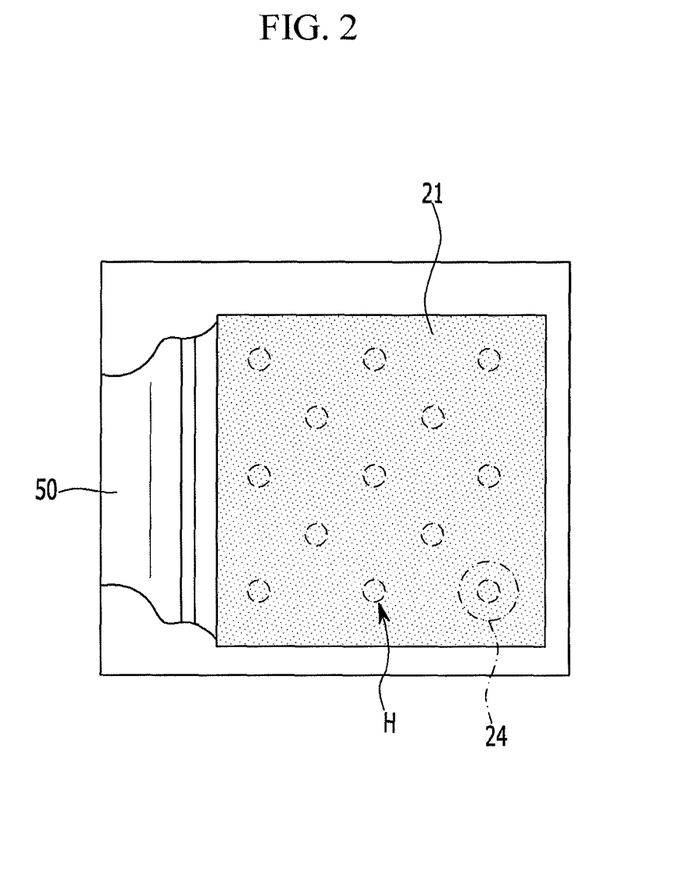
FIG. 2 illustrates another view of the protection element.

FIG. 2 illustrates an example of a horizontal section viewed from the surface on which the first conductive layer 20 is formed. In this view, the first and second conductive layers 20 and 30 are laminated on opposite surfaces of the PTC material layer 10, and a second electrode lead layer 50 is laminated on the second conductive layer 30 in the protection element.

Referring to FIG. 2, the conducting portions 24 and 34 in the first and second conductive layers 20 and 30 include the through-holes H. The horizontal sectional area of the through-holes H has a circular shape with a diameter of about 100 μm to 200 μm. In another embodiment, the horizontal sectional area of the through-holes H may have a different diameter and/or shape.

The adhesive layers 22 and 23 include an insulative material. As illustrated in FIG. 1, conductive materials 24a and 34a are coated on inner wall surfaces of the through-holes H. Because the conductive materials 24a and 34a are only coated on the inner wall surfaces of the through-holes H in this embodiment, inner holes h1 and h2 respectively pass through the conductive materials 24a and 34a. These conductive materials 24a and 34a allow current to pass between the first metal layer 21 and the second metal layer 23 and between the first metal layer 31 and the second metal layer 33, respectively.

Figure 3:
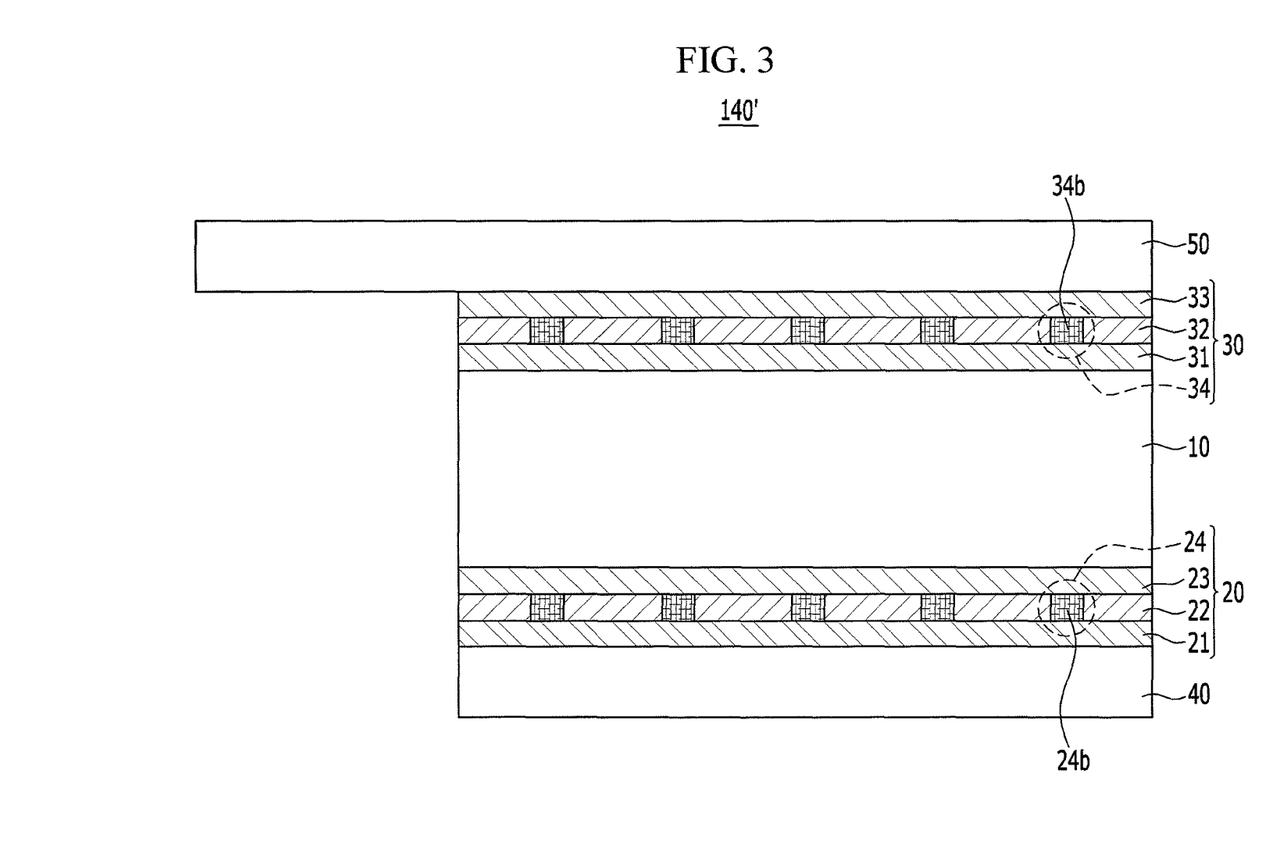
FIG. 3 illustrates another embodiment of a protection element.

FIG. 3 illustrates another exemplary embodiment of the protection element 140'. In this embodiment, the through-holes H are filled with conductive materials 24b and 34b. This may improve conduction performance as compared to the case where the inner wall surfaces of the through-holes H are coated with the conductive materials 24a and 34a as shown in FIG. 1. The conductive materials 24a, 34a, 24b, and 34b may be any material having electrical conductivity.

The second metal layers 23 and 33, for allowing a current to be conducted to the first metal layers 21 and 31, are laminated on the adhesive layers 22 and 32 including the conducting portions 24 and 34. The second metal layers 23 and 33 may include a predetermined material (e.g., gold) coated on a metal foil, e.g., copper (Cu) plated with nickel (Ni).

The first electrode lead layer 40 is laminated on the first conductive layer 20, so that the first electrode lead layer 40 and the first conductive layer 20 are electrically connected to each other. The second electrode lead layer 50 is laminated on the second conductive layer 30, so that the second electrode lead layer 50 and the second conductive layer 30 are electrically connected to each other. As shown in FIG. 4, the second electrode lead layer 50 allows the electrode terminal 122 and the protection element 140' in the rechargeable battery 200 to be electrically connected to each other, and as a result electrically connected to a negative electrode 101 of the electrode assembly 100. The first electrode lead layer 40 allows the protective circuit board 130 and the protection element 140' to be electrically connected to each other, and as a result electrically connected to a positive electrode 102 of the electrode assembly 100.

The thickness of the protection element 140' may be, for example, about 0.3 mm to 1 mm. In this range and for at least some applications, the rechargeable battery 200 including the protection element may be slim and compact while ensuring the ease of manufacturing the protection element 140'. The thickness of the protection element may be different in another embodiment.

The protection element 140' includes a structure in which the adhesive layers 22 and 32 having the conducting portions 24 and 34 formed therein are laminated on the first and second conductive layers 20 and 30 on opposite surfaces of the PTC material layer 10, respectively. Thus, it is possible to prevent the electrode lead layers 40 and 50 and the conductive layers 20 and 30 from being separated from each other even by a strong external impact. As a result, durability of the protection element 140' may be substantially improved.

Figure 5:
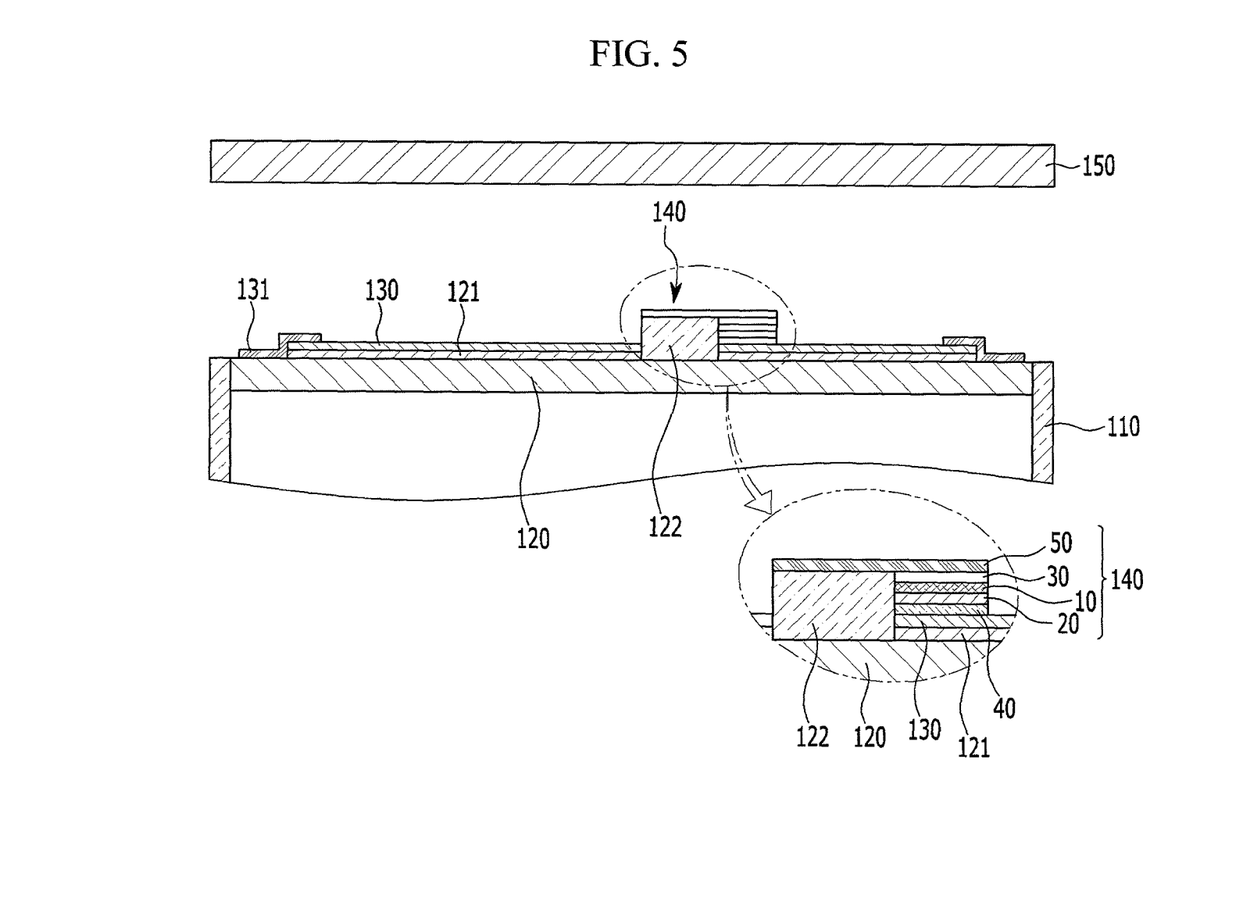
FIG. 5 illustrates a sectional structure of the rechargeable battery.

FIG. 4 is an exploded perspective view of an embodiment of the rechargeable battery 200, and FIG. 5 illustrates an example of a sectional structure of the rechargeable battery in FIG. 4.

Referring to FIGS. 4 and 5, the rechargeable battery 200 includes the electrode assembly 100, a case 110, a cap plate 120, the protective circuit board 130, and the protection element 140'. A prismatic battery will be described as an example of the rechargeable battery 200, but battery may be a different kind of battery in another embodiment, e.g., various types of rechargeable batteries such as a pouch battery and a lithium polymer battery.

The electrode assembly 100 includes the negative electrode (second electrode) 101, the positive electrode (first electrode) 102, and a separator 103 between the negative and positive electrodes 101 and 102. The negative electrode 101 and the positive electrode 102 and the separator 103 serving as an insulator are spirally wound into a jelly-roll shape to form the electrode assembly 100. The electrode assembly 100 may have a different shape or structure in another embodiment. In one embodiment, the electrode assembly 100 may have a structure in which the positive electrode 102, the separator 103, and the negative electrode 101 are sequentially laminated, so that the separator 103 is between the positive electrode 101 and the negative electrode 101.

A positive electrode tab 105 is fixed to the positive electrode 102, and a negative electrode tab 104 is fixed to the negative electrode 101. The positive electrode tab 105 and the negative electrode tab 104 may, for example, be parallel to the winding axis. The positive electrode tab 105 and the negative electrode tab 104 protrude from a section where the layers are exposed in the electrode assembly 100. In one embodiment, the positive electrode tab 105 and the negative electrode tab 104 protrude in the direction in which an opening is formed in the case 110. The positive electrode tab 105 and the negative electrode tab 104 are spaced apart from each other by a predetermined distance, in order to allow them to be electrically insulated from each other.

The positive electrode tab 105 includes an electrically conductive metal, e.g., nickel or aluminum. The positive electrode tab 105 is electrically connected to the cap plate 120. The negative electrode tab 104 includes an electrically conductive metal, e.g., copper or nickel. The negative electrode tab 104 is electrically connected to the electrode terminal 122.

The electrode assembly 100 is accommodated in an internal space of the case 110. The case has an opening which, for example, may be at the top of the case 110. The case 110 is electrically connected to the positive electrode tab 105 and may be manufactured, for example, by machining aluminum or an aluminum alloy through a process such as deep drawing.

The cap plate 120 has the shape of a long plate extending in one direction. The cap plate 120 may have a different shape in another embodiment. The cap plate 120 is coupled to the opening of the case 110 to close and seal the case 110 through a process such as laser welding. The cap plate 120 may be formed of electrically conductive metal, e.g., aluminum or an aluminum alloy. The positive electrode tab 105 is welded or otherwise attached to the bottom surface of the cap plate 120, so that the cap plate 120 may have the same polarity as the positive electrode 102.

An electrode terminal hole is formed in the middle of the cap plate 120. The electrode terminal 122 passes through the electrode terminal hole. An insulating layer plate 121 is between the electrode terminal 122 and the cap plate 120. Thus, the electrode terminal 122 and the cap plate 120 are electrically insulated from each other. The insulating layer plate 121 is formed as a plate having an electrical insulating property, is disposed parallel to the cap plate 120, and is adjacent to or surrounds a circumference of the electrode terminal 122.

The electrode terminal 122 passes through the cap plate 120. The electrode terminal 122 is connected to the negative electrode tab 104 and electrically connected to the negative electrode 101 of the electrode assembly 100.

A protective circuit module for controlling charging and discharging operations of the electrode assembly 100 is mounted on the cap plate 120. When an excessive current of a threshold value or more flows in the rechargeable battery 200 through the protective circuit module, the temperature of the electrode assembly 100 may increase to a high temperature of a set value or more and/or the rechargeable battery 200 may overcharged or over-discharged. When this occurs, the protective circuit module may cut off conduction of current and protect the electrode assembly 100.

The protective circuit module includes the protection element 140' electrically connected to the protective circuit board 130. The protective circuit board 130 may include a plurality of electrical elements, e.g., charge and discharge switching elements (FETs), a capacitor, and/or a resistor.

An electrode terminal hole is formed in the middle of the protective circuit board 130 to expose the electrode terminal 122 passing through the cap plate 120. The electrode terminal 122 is electrically connected to the second electrode lead layer 50 of the protection element 140'. As a result, the negative electrode 101 of the electrode assembly 100 is electrically connected to the second electrode lead layer 50 of the protection element 140'.

The protective circuit board 130 may include connection members 131 for electrically connecting the protective circuit board 130 to the electrode assembly 100. The connection members 131, for example, may be formed at respective ends of the protective circuit board 130. As illustrated in FIGS. 4 and 5, the connection members 131 may extend onto the cap plate 120 from edges of the ends of the protective circuit board 130. The connection member 131 may be bent, for example, in a step shape connecting the top surface of the protective circuit board 130 and the top surface of the cap plate 120.

The connection member 131 may connect the protective circuit board 130 and the cap plate 120 to each other. As a result, the positive electrode 102 of the electrode assembly 100 and the protective circuit board 130 may be electrically connected to each other through the cap plate 120, having the same polarity as the positive electrode 102 of the electrode assembly 100. The connection member 131 may be formed, for example, by machining a nickel thin plate in a predetermined shape.

The connection members 131 may be fixed to respective ends of the protective circuit board 130, and then mounted on the cap plate 120. The fixing and the mounting of the connection members 131 may be performed through a process such as welding.

The protection element 140' is electrically connected to the electrode terminal 122 provided to the cap plate 120 and the protective circuit board 130, to thereby form a current path. If the temperature of the electrode assembly 100 exceeds a predetermined threshold value, electrical resistance of the protection element 140' increases to forcibly reduce charge current and/or discharge current. The components of the protection element 140' may be as described above.

In the rechargeable battery 200, the protection element 140' is not separated even by a strong external impact, thereby ensuring excellent durability. Further, it is possible to smoothly form a current path between the protective circuit board 130 and the electrode assembly 100, thereby preventing in advance a risk of damage caused by an overcharge and over-discharge condition.

An upper cover 150 is provided to accommodate the protective circuit board 130 and the protection element 140', mounted on the cap plate 120. The upper cover 150 may be formed, for example, to have a concave shape to accommodate the protective circuit board 130 and the protection element 140'.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

In accordance with one Example, a protection element was manufactured by sequentially laminating a first conductive layer and a second conductive layer on opposite surfaces of a PTC material layer, and attaching nickel lead lines to the respective first and second conductive layers. The first conductive layer was formed by coating gold on a copper thin film plated with nickel. A prepreg layer was formed in each of the first and second conductive layers and had 13 through-holes of $\Phi 0.15$, formed in its horizontal cross-section of 2.4 mm×2.4 mm. The second conductive layer was formed by coating gold on a copper thin film plated with nickel.

In accordance with a Comparative Example, a protective element was manufactured by laminating conductive layers on opposite surfaces of a PTC material layer and respectively attaching nickel lead lines to the conductive layers. The conductive layer was formed by coating gold on a copper thin film plated with nickel.

In accordance with an experiment, a tensile strength test was performed on the protection elements manufactured according to the Example ("Exemplary Embodiment") and the Comparative Example using a tensile strength test device (model name: DS2-500N). The results are shown in the following Table 1.

TABLE 1

| Classification | Tensile strength test (unit: Kgf/cm2) |
| --- | --- |
| Exemplary Embodiment | 1.24 |
| Comparative Example | 0.60 |

Referring to Table 1, in the protection element according to the Exemplary Embodiment, which includes adhesive layers having a plurality of conducting portions formed in the first and second conductive layers as described above, the tensile strength of the protection element is high, so that the protection element is not easily separated even by an external impact, thereby ensuring excellent durability.

On the other hand, in the protection element according to the Comparative Example, which includes no adhesive layer, the tensile strength of the protection element is remarkably low as compared with the exemplary embodiment, so that the protection element is easily separated even by a weak external impact.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A protection element, comprising:
   a positive temperature coefficient (PTC) material layer;
   a first conductive layer on a first surface of the PTC material layer, the first conductive layer including a sequential laminate of a first metal layer, a first adhesive layer including a plurality of first conducting portions, and a second metal layer electrically connected to the first metal layer through the first conducting portions;
   a second conductive layer on a second surface of the PTC material layer, the second conductive layer including a sequential laminate of a third metal layer, a second adhesive layer including a plurality of second conducting portions, and a fourth metal layer electrically connected to the third metal layer through the second conducting portions;
   a first electrode lead layer electrically connected to the first conductive layer; and
   a second electrode lead layer electrically connected to the second conductive layer.

2. The protection element as claimed in claim 1, wherein the conducting portions of the first conductive layer and the conducting portions of the second conductive layer are aligned substantially in a same column.

3. The protection element as claimed in claim 1, wherein a total sum of cross-sectional areas of the conducting portions in a first direction is about 20% to 70% of a cross-sectional area of the adhesive layer in the first direction.

4. The protection element as claimed in claim 1, wherein:
   the first and second conducting portions include a through-hole, and
   a section of the through-hole in a first direction has a substantially circular shape with a diameter of about 100 μm to 200 μm.

5. The protection element as claimed in claim 4, wherein the through-hole has a wall surface coated with a conductive material.

6. The protection element as claimed in claim 4, wherein an interior of the through-hole is filled with a conductive material.

7. The protection element as claimed in claim 1, wherein a thickness of the adhesive layer is about 10 μm to 30 μm.

8. The protection element as claimed in claim 1, wherein a thickness of the protection element is about 0.3 mm to 1 mm.

9. A rechargeable battery, comprising:
   a case including an electrode assembly, the electrode assembly including a first electrode and a second electrode;
   a cap plate coupled to an opening of the case;
   an electrode terminal coupled to the cap plate and electrically connected to the first electrode;
   a protective circuit board mounted on the cap plate, the protective circuit board electrically connected to the second electrode; and
   the protection element as claimed in claim 1 having a first side connected to the electrode terminal and a second side connected to the protective circuit board.

10. The rechargeable battery as claimed in claim 9, wherein:
    the first electrode lead layer of the protection element is electrically connected to the protective circuit board, and
    the second electrode lead layer of the protection element is electrically connected to the electrode terminal.

11. An apparatus, comprising:
    a positive temperature coefficient (PTC) material layer;
    a first conductive layer on a first surface of the PTC material layer;
    a second conductive layer on a second surface of the PTC material layer;
    a first electrode lead layer on the first conductive layer; and
    a second electrode lead layer on the second conductive layer, wherein the first conductive layer includes a plurality of laminated first layers and the second conductive layer includes a plurality of laminated second layers, the laminated first layers of the first conductive layer including a first layer of non-conductive material having a plurality of first through-holes including a first conductive material, the first conductive material to electrically connect at least two other first layers, and the laminated second layers of the second conductive layer including a second layer of non-conductive material having a plurality of second through-holes including a second conductive material, the second conductive material connecting to electrically connect at least two other second layers.

12. The apparatus as claimed in claim 11, wherein:
    the at least two other first layers include a first metal layer and a second metal layer,
    the first layer of non-conductive material is a first adhesive layer including the first through-holes, and
    the at least two other second layers include third metal layer, and a fourth metal layer, and
    the second layer of non-conductive material is a second adhesive layer including the second through-holes.

13. The apparatus as claimed in claim 12, wherein:
    in each of the first through-holes, the first conductive material is on a wall of the first through-holes and another hole passes through the first conductive material, and
    in each of the second through-holes, the second conductive material is on a wall of the second holes and another hole passes through the second conductive material.

14. The apparatus as claimed in claim 12, wherein the first and second conductive materials fill the first through-holes and the second through-holes.

15. The apparatus as claimed in claim 12, wherein the first through-holes are substantially aligned with respective ones of the second through-holes.

16. The apparatus as claimed in claim 12, wherein:
    a total sum of sectional areas of the first through-holes is substantially 20% to 70% of a sectional area of the first adhesive layer of the first layers, and
    a total sum of sectional areas of the second through-holes is substantially 20% to 70% of a sectional area of the second adhesive layer of the second layers.

17. The apparatus as claimed in claim 11, wherein sizes of the first-through holes and the second through-holes are substantially equal.

* * * * *